United States Patent
Depraete et al.

(10) Patent No.: US 9,562,598 B2
(45) Date of Patent: Feb. 7, 2017

(54) TORQUE CONVERTER AND HYDROKINETIC TORQUE COUPLING DEVICE HAVING TURBINE-PISTON LOCKUP CLUTCH WITH LOCKUP RESISTANCE MEMBER

(71) Applicant: VALEO EMBRAYAGES, Amiens (FR)

(72) Inventors: Alexandre Depraete, Bloomfield, MI (US); David Werthman, Royal Oak, MI (US)

(73) Assignee: Valeo Embrayages (FR)

( * ) Notice: Subject to any disclaimer, the term of this patent is extended or adjusted under 35 U.S.C. 154(b) by 31 days.

(21) Appl. No.: 14/562,022

(22) Filed: Dec. 5, 2014

(65) Prior Publication Data

US 2016/0160972 A1 Jun. 9, 2016

(51) Int. Cl.
*F16D 33/18* (2006.01)
*F16H 45/02* (2006.01)
(Continued)

(52) U.S. Cl.
CPC ............... *F16H 45/02* (2013.01); *F16D 33/18* (2013.01); *F16H 41/24* (2013.01);
(Continued)

(58) Field of Classification Search
CPC .............. F16D 33/18; F16H 2045/0247; F16H 2045/0263; F16H 2045/0221; F16H 2045/0289; F16H 2045/021; F16H 41/24
See application file for complete search history.

(56) References Cited

U.S. PATENT DOCUMENTS 2,130,895 A 9/1938 Ness
2,860,747 A 11/1958 Kelley
(Continued)

FOREIGN PATENT DOCUMENTS

DE 1550957 A1 7/1969
DE 2245901 A1 4/1974
(Continued)

OTHER PUBLICATIONS

Lindemann et al., "iTC—Innovative Solutions for Torque Converters Pave the Way into the Future", Torque Converter 20, pp. 280-301.

(Continued)

*Primary Examiner* — Jacob S Scott
*Assistant Examiner* — Tinh Dang
(74) *Attorney, Agent, or Firm* — Berenato & White, LLC (57) ABSTRACT

A torque converter includes an impeller, a turbine-piston hydrodynamically drivable by the impeller, a stator, and an annular lockup resistance member. The impeller includes an impeller shell. The turbine-piston includes a turbine-piston shell. The turbine-piston shell includes a turbine-piston flange having a first flange surface facing an engagement surface of the impeller shell. The turbine-piston is movable axially toward and away from the engagement surface to position the torque converter into and out of a lockup mode in which the turbine-piston flange is mechanically locked to the impeller shell. The annular lockup resistance member is in the form of an annular elastomeric sandwich washer coaxially aligned with the rotational axis and including turbine-side and stator-side members, and an elastomeric inner member sandwiched between the turbine-side and stator-side members.

20 Claims, 9 Drawing Sheets

(51) Int. Cl.
*F16H 41/24* (2006.01)
*F16H 45/00* (2006.01)

(52) U.S. Cl.
CPC .............. *F16H 2045/007* (2013.01); *F16H 2045/0205* (2013.01); *F16H 2045/0231* (2013.01); *F16H 2045/0263* (2013.01); *F16H 2045/0278* (2013.01); *F16H 2045/0294* (2013.01)

(56) References Cited

U.S. PATENT DOCUMENTS

| | | | |
|---|---|---|---|
| 2,992,713 | A | 7/1961 | Stump et al. |
| 3,041,892 | A | 7/1962 | Schjolin |
| 3,252,352 | A | 5/1966 | General et al. |
| 4,041,701 | A | 8/1977 | Goto et al. |
| 5,713,442 | A | 2/1998 | Murata et al. |
| 5,813,505 | A | 9/1998 | Olsen et al. |
| 6,026,940 | A | 2/2000 | Sudau |
| 6,915,886 | B2 | 7/2005 | Dacho et al. |
| 7,191,879 | B2 | 3/2007 | Arhab et al. |
| 7,445,099 | B2 | 11/2008 | Maucher et al. |
| 8,276,723 | B2 | 10/2012 | Verhoog et al. |
| 2003/0168298 | A1 | 9/2003 | Holler et al. |
| 2003/0168299 | A1 | 9/2003 | Holler et al. |
| 2004/0011032 | A1 | 1/2004 | Holler et al. |
| 2006/0086584 | A1 | 4/2006 | Maucher et al. |
| 2010/0269497 | A1* | 10/2010 | Engelmann .......... F16F 15/145 60/338 |
| 2013/0230385 | A1 | 9/2013 | Lindemann et al. |
| 2014/0014454 | A1 | 1/2014 | Davis |
| 2014/0014455 | A1 | 1/2014 | Davis |
| 2014/0097055 | A1 | 4/2014 | Lindemann et al. |
| 2014/0110207 | A1 | 4/2014 | Davis |
| 2015/0362041 | A1 | 12/2015 | Lee et al. |

FOREIGN PATENT DOCUMENTS

| | | |
|---|---|---|
| DE | 10226860 A1 | 12/2003 |
| EP | 0125428 A1 | 11/1984 |
| EP | 1744074 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| GB | 598811 | 2/1948 |
| JP | 58-131466 A | 8/1983 |
| KR | 101311531 B1 | 9/2013 |
| WO | WO2004018897 | 3/2004 |
| WO | 2004046574 A1 | 6/2004 |

OTHER PUBLICATIONS

U.S. Appl. No. 14/510,244, filed Oct. 9, 2014, First Named Inventor: Alexandre Depraete.
U.S. Appl. No. 14/510,267, filed Oct. 9, 2014, First Named Inventor: Alexandre Depraete.
U.S. Appl. No. 14/522,189, filed Oct. 23, 2014, First Named Inventor: Alexandre Depraete.
U.S. Appl. No. 14/522,263, filed Oct. 23, 2014, First Named Inventor: Alexandre Depraete.
U.S. Appl. No. 14/522,302, filed Oct. 23, 2014, First Named Inventor: Alexandre Depraete.
U.S. Appl. No. 14/522,333, filed Oct. 23, 2014, First Named Inventor: Alexandre Depraete.
U.S. Appl. No. 14/522,361, filed Oct. 23, 2014, First Named Inventor: David Werthman.
U.S. Appl. No. 14/522,372, filed Oct. 23, 2014, First Named Inventor: Alexandre Depraete.
U.S. Appl. No. 14/522,393, filed Oct. 23, 2014, First Named Inventor: Alexandre Depraete.
U.S. Appl. No. 14/561,961, filed Dec. 5, 2014, First Named Inventor: Alexandre Depraete.
U.S. Appl. No. 14/562,064, filed Dec. 5, 2014, First Named Inventor: Alexandre Depraete.
U.S. Appl. No. 14/562,099, filed Dec. 5, 2014, First Named Inventor: Alexandre Depraete.
U.S. Appl. No. 14/562,136, filed Dec. 5, 2014, First Named Inventor: Alexandre Depraete.
U.S. Appl. No. 14/562,216, filed Dec. 5, 2014, First Named Inventor: Sungchul Lee.
U.S. Appl. No. 14/562,253, filed Dec. 5, 2014, First Named Inventor: Alexandre Depraete.
U.S. Appl. No. 14/562,286, filed Dec. 5, 2014, First Named Inventor: Alexandre Depraete.
U.S. Appl. No. 14/687,602, filed Apr. 15, 2015, First Named Inventor: Alexandre Depraete.

* cited by examiner

TORQUE CONVERTER AND HYDROKINETIC TORQUE COUPLING DEVICE HAVING TURBINE-PISTON LOCKUP CLUTCH WITH LOCKUP RESISTANCE MEMBER

BACKGROUND OF THE INVENTION

1. Field of the Invention

The present invention generally relates to torque converters and hydrokinetic torque coupling devices, and more particularly to torque converters and hydrokinetic torque coupling devices including turbine-piston lockup clutches for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, there is provided a torque converter including an impeller having a rotational axis and including an impeller shell having a first engagement surface, and a turbine-piston coaxially aligned with and hydro-dynamically drivable by the impeller. The turbine-piston includes a turbine-piston shell having a turbine-piston flange with a first surface and an opposite second engagement surface facing the first engagement surface of the impeller shell. The turbine-piston is movable axially toward and away from the first engagement surface to position the torque converter respectively into and out of a lockup mode in which the turbine-piston flange is mechanically locked to so as to be non-rotatable relative to the impeller shell. The torque converter further includes an annular lockup resistance member including an annular elastomeric sandwich washer coaxially aligned with the rotational axis and disposed between the impeller shell and the turbine-piston shell so as to resist axial movement of the turbine-piston flange toward the first engagement surface and into lockup with the impeller shell. The annular elastomeric sandwich washer includes axially opposite first and second outer members, and an elastomeric inner member sandwiched between the first outer member and the second outer member.

According to a second aspect of the invention, there is provided a hydrokinetic torque coupling device for coupling together a driving shaft and a driven shaft. The hydrokinetic torque coupling device of this second aspect includes a casing and a torque converter coaxially aligned with one another and rotatable about a rotational axis. The casing has a first engagement surface and includes an impeller shell and a casing shell interconnected to and non-rotatable relative to the impeller shell. The torque converter includes an impeller having the impeller shell, and a turbine-piston hydrodynamically drivable by the impeller and including a turbine-piston shell. The turbine-piston shell includes a turbine-piston flange having a second engagement surface facing the first engagement surface of the casing. The turbine-piston is movable axially to move the second engagement surface toward and away from the first engagement surface to position the hydrokinetic torque coupling device respectively into and out of a lockup mode in which the turbine-piston flange is mechanically locked to so as to be non-rotatable relative to the casing. The torque converter further includes an annular lockup resistance member including an annular elastomeric sandwich washer coaxially aligned with the rotational axis and disposed between the impeller shell and the turbine-piston shell so as to resist axial movement of the turbine-piston flange toward the first engagement surface and into lockup with the impeller shell. The annular elastomeric sandwich washer includes axially opposite first and second outer members, and an elastomeric inner member sandwiched between the first outer member and the second outer member.

A third aspect of the invention provides a method of assembling the hydrokinetic torque coupling device for coupling a driving shaft and a driven shaft together. The method involves providing a torque converter rotatable about a rotational axis. The torque converter comprises an impeller including an impeller shell having a first engagement surface, and a turbine-piston hydrodynamically drivable by the impeller and including a turbine-piston shell. The turbine-piston shell includes a turbine-piston flange having a second engagement surface facing the first engagement surface of the impeller shell. The turbine-piston is movable axially toward and away from the first engagement surface to position the torque converter respectively into and out of a lockup mode in which the turbine-piston is mechanically locked to so as to be non-rotatable relative to the impeller shell. The torque converter further includes an annular lockup resistance member including an annular elastomeric sandwich washer coaxially aligned with the rotational axis and disposed between the impeller shell and the turbine-piston shell so as to resist axial movement of the turbine-piston flange toward the first engagement surface and into lockup with the impeller shell. The annular elastomeric sandwich washer includes axially opposite first and second outer members, and an elastomeric inner member sandwiched between the first outer member and the second outer member. A casing cover shell is operatively connected to the impeller shell to form a casing that is rotatable about the rotational axis.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims means "at least one."

Figure 1:
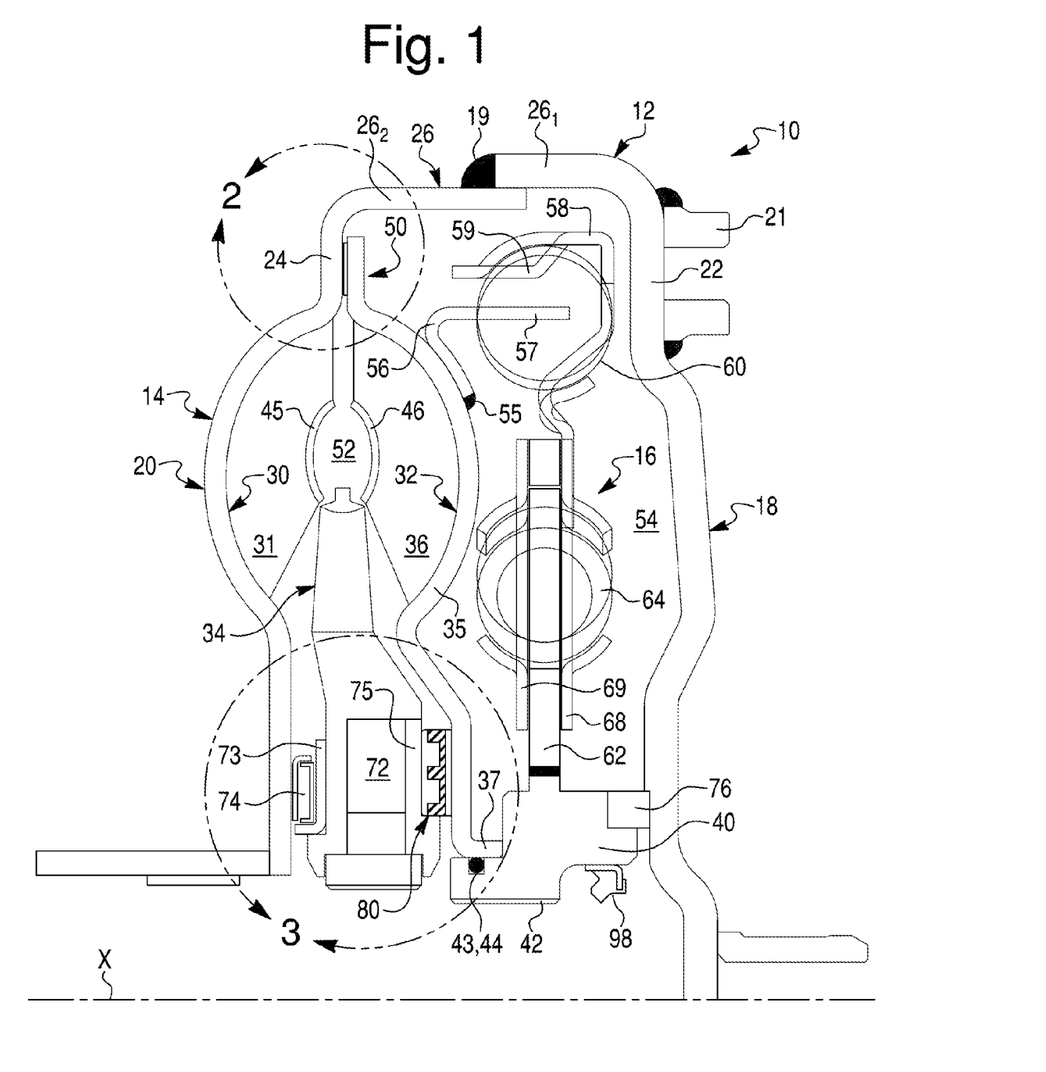
FIG. 1 is a fragmented half-view in axial section of a hydrokinetic torque coupling device equipped with a turbine-piston in accordance with a first exemplary embodiment of the present invention.

A first exemplary embodiment of a hydrokinetic torque coupling device is generally represented in the accompanying drawings by reference numeral 10, as best shown in the fragmentary sectional view in FIG. 1. The hydrokinetic torque coupling device 10 is operable to fluidly or mechanically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14, and a torsional vibration damper (also referred to herein as a damper assembly) 16 are all rotatable about a rotational axis X. The drawings discussed herein show half-views, that is, the portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and around the rotational axis X, respectively.

The sealed casing 12 according to the first exemplary embodiment as illustrated in FIG. 1 includes a first casing shell (or casing cover shell) 18 and a second casing shell 20 fixedly interconnected sealingly together, such as by welding at weld 19 at their outer peripheries, so as to be non-movable relative to one another. The first casing shell 18 is fixedly interconnected to the driving shaft, more typically a flywheel (not shown) that is fixed to and non-rotatable relative to the driving shaft, so that the casing 12 turns at the same speed that the engine operates for transmitting torque. Specifically, in the illustrated embodiment of FIG. 1 the casing 12 is rotatably driven by the internal combustion engine and is non-rotatably coupled to the flywheel thereof with studs 21, shown in FIG. 1. Each of the first and second casing shells 18, 20 may be made, for example, formed integrally by press-forming one-piece metal sheets.

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 toward the second casing shell 20. Similarly, the second casing shell 20 includes a second sidewall portion 24 extending substantially radially relative to the direction from the rotational axis X and a cylindrical second outer wall portion $26_2$ extending substantially axially from the second sidewall portion 24 toward the first casing shell 18. The second sidewall portion 24 has a first engagement surface 25, best shown in FIG. 2. The first and second outer wall portions $26_1$, $26_2$ collectively establish an annular outer wall 26 substantially parallel with the rotation axis X. The weld 19 fixedly secures the outer wall portions $26_1$ and $26_2$ together.

The torque converter 14 includes an impeller (sometimes referred to as the pump or impeller wheel) 30, a turbine-piston 32, and a stator (sometimes referred to as the reactor) 34 interposed axially between the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as the impeller shell of the impeller 30. Accordingly, the impeller shell 20 sometimes is referred to as part of the casing 12. The impeller 30 further includes a core ring 45, and a plurality of impeller blades 31 fixedly attached, such as by brazing, to the impeller shell 20. The impeller 30, including the impeller shell 20, the core ring 45, and the blades 31, is fixedly secured to so as to be non-rotatable relative to the first casing shell 18 and hence to the drive shaft (or flywheel) of the engine so that the impeller 30 rotates at the same speed as the engine output.

The hydrokinetic torque coupling device 10 further includes an output hub 40 that is rotatable about the rotational axis X. The output hub 40 is operatively coupled to and coaxial with the driven shaft. For example, the output hub 40 may be provided with internal splines 42 for non-rotatably coupling the output hub 40 to the driven shaft, such as a transmission input shaft, provided with complementary external splines. Alternatively, a weld or other connection may be used to fix the output hub 40 to the driven shaft. A radially outer surface of the output hub 40 includes an annular slot 43 for receiving a sealing member, such as an O-ring 44. A sealing member 98, mounted to a radially inner peripheral surface of the output hub 40, creates a seal at the interface of the transmission input shaft and the output hub 40, as best shown in FIG. 1.

The turbine-piston 32 is a consolidation or incorporation of a turbine with a lockup clutch piston. The turbine component of the turbine-piston 32 includes a turbine-piston shell 35, a core ring 46, and a plurality of turbine-piston blades 36 fixedly attached, such as by brazing, to the turbine-piston shell 35. The spinning of the impeller 30 causes transmission fluid in the torus to spin the turbine-piston blades 36, and hence the turbine-piston shell 35. The impeller shell 20 and the turbine-piston shell 35 collectively define a substantially toroidal first chamber (or torus chamber) 52 therebetween. Referring to FIG. 1, the torus chamber 52 is to the left side of the turbine-piston shell 35, and a second (or damper) chamber 54 is to the other (right) side of the turbine-piston shell 35. In other words, the first chamber 52 is defined between the impeller shell 20 and the turbine-piston shell 35, while the second chamber 54 is defined between the turbine-piston shell 35 and the first casing shell 18.

Returning to FIG. 1, the stator 34 is positioned between the impeller 30 and the turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is interposed between a side bearing ring 73, which is mounted to a side of the stator 34, and the impeller shell 20 of the casing 12.

Extending axially at a radially inner peripheral end of the turbine-piston shell 35 is a substantially cylindrical flange 37 that is proximate to the rotational axis. The substantially cylindrical flange 37 of the turbine-piston 32 is rotatable relative to the output hub 40. The sealing member (e.g., O-ring) 44 creates a seal at the interface of the substantially cylindrical flange 37 and the output hub 40. As discussed in further detail below, the turbine-piston 32 is axially movably relative to the output hub 40 along this interface.

The piston component of the turbine-piston 32 includes a substantially annular, planar (i.e., flat) turbine-piston flange (or turbine-piston wall) 38. The turbine-piston flange 38 is distal to the rotational axis X relative to the above-discussed proximal flange 37. The turbine-piston flange 38 is a radial extension of the turbine-piston shell 35 and, as illustrated in FIG. 1, is disposed radially outside of the turbine-piston blades 36. The turbine-piston flange 38 and the turbine-piston shell 35 are embodied as integral with one another, e.g., made of a single or unitary component, but may be separate components connected together. The turbine-piston flange 38 extends from a radially outer peripheral end of the turbine-piston shell 35 radially outward, transverse to rotational axis X, to terminate at an end in spaced relationship to the inner peripheral surface of the annular outer wall portion 26 of the casing 12. The turbine-piston flange 38 extends sufficiently outward radially to axially overlap with the second sidewall portion 24 of the second casing shell 20.

Figure 2:
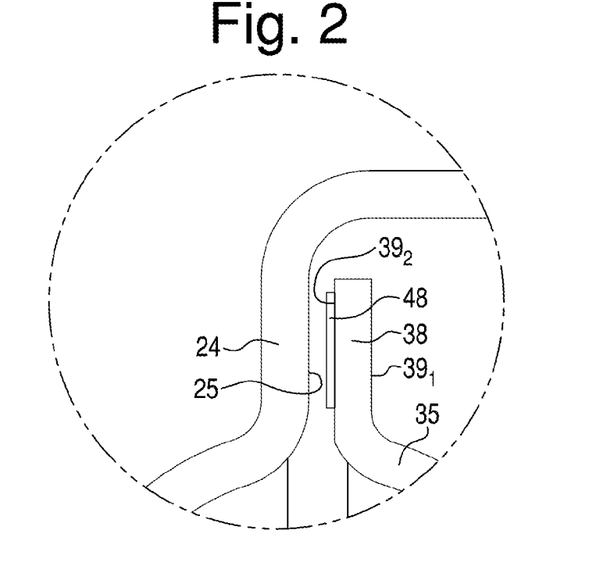
FIG. 2 is an enlarged view of a fragment of the hydrokinetic torque coupling device shown in the circle "II" in FIG. 1.

As best shown in FIG. 2, the turbine-piston flange 38 has two axially opposite planar surfaces: a first flange surface $39_1$ facing the first sidewall portion 22 of the first casing shell 18, and an opposite second engagement surface $39_2$ facing the first engagement surface 25 of the second sidewall portion 24 of the second casing shell 20. The first engagement surface 25 and the second engagement surface $39_2$ are parallel to and face one another, and extend radially at a 90 degree angle relative to the rotational axis X. The turbine piston 32 is axially displaceable to move the second engagement surface $39_2$ axially toward and away from the first engagement surface 25 of the casing 12 to position the turbine-piston flange 38 of the turbine-piston 32 respectively into and out of a lockup position, or, in other words, to position the torque coupling device 10 into and out of a lockup mode, respectively. The second engagement surface $39_2$ of the turbine-piston flange 38 of the turbine-piston 32 and the first engagement surface 25 of the second sidewall portion 24 of the casing 12 together create a lockup clutch 50 that bypasses the hydrodynamic fluid coupling of the torque converter 14 and mechanically couples the driving and driven shafts.

In accordance with the first exemplary embodiment, the second engagement surface $39_2$ of the turbine-piston flange 38 is provided with a friction ring (or friction lining) 48, best shown in FIG. 2, which shows the lockup clutch 50 in a non-lockup mode. The friction ring 48 may be secured to the second engagement surface $39_2$, for example, by adhesive bonding and/or with fasteners. The friction ring 48 is made of a friction material for improved frictional performance. Alternatively, a friction ring (or friction lining) may be secured to the first engagement surface 25. According to still another embodiment, a first friction ring or liner is secured to the first engagement surface 25 of the casing 12 and a second friction ring or liner is secured to the second engagement surface 39$_2$. It is within the scope of the invention to omit one or both of the friction rings.

Depending on conditions, when the torque converter 14 transmits torque hydro-dynamically, the action of the transmission fluid generates an axial force which moves the turbine-piston 32 toward the impeller 30 and into the lockup mode. This axial force varies depending on the speed, torque, drive, and coast. Under some stable or transient conditions, the axial force may axially displace the turbine-piston 32 into contact with the impeller 30 and close the lockup clutch 50 in unexpected circumstances, i.e., when hydrodynamic transmission mode is desired. Therefore, the chance of premature lock-up clutch engagement is possible.

During the non-lockup mode of operation, when the torque converter 14 transmits the movement hydro-dynamically (i.e., a hydrodynamic transmission mode of operation), the turbine-piston 32 is urged towards the stator 34, therefore the chance of pre-mature lock-up clutch engagement is possible. Instances of unintentional lockup can be reduced by including and/or increasing the biasing force of a spring located between the stator 34 and the turbine-piston shell 35. However, an increase in spring biasing force can also slow the lockup response time of the turbine-piston 32, and thereby increase the pressure necessary to axially displace the turbine-piston 32 into lockup mode.

In order to avoid or at least reduce the occurrence of unintended/premature lockup clutch engagement, the torque coupling device 10 further includes an annular lockup resistance member 80 in the form of an annular elastomeric sandwich washer. The annular elastomeric sandwich washer 80 especially resists unintended lockup at lower speed ratios by limiting displacement between the stator 34 and the turbine-piston 32 while the torque converter 14 is in the hydrodynamic transmission mode of operation. The elastomeric sandwich washer 80 is configured to urge the turbine-piston 32 axially away from the stator 34 and is rotatable relative to at least one of the turbine-piston 32 and the stator 34.

Figure 6:
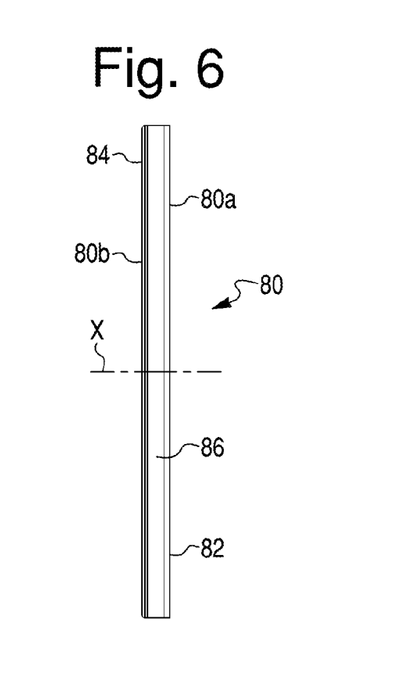
FIG. 6 is a side view of the lockup resistance member in accordance with the first exemplary embodiment of the present invention.
Figure 7:
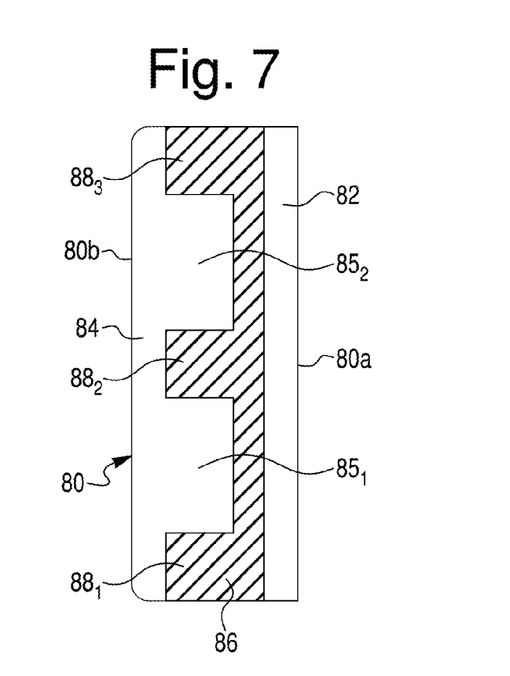
FIG. 7 is a cross-sectional view of the lockup resistance member in accordance with the first exemplary embodiment of the present invention.

According to the embodiment shown in FIGS. 1, 6 and 7, the elastomeric sandwich washer 80 is coaxially aligned with the rotational axis X and includes a rigid (or stiff) non-elastomeric turbine-side (or first) outer member (or retainer) 82, a rigid (or stiff) non-elastomeric stator-side (or second) outer member (or retainer) 84, and an elastomeric inner member 86 disposed (or sandwiched) between the turbine-side outer member 82 and the stator-side outer member 84. The elastomeric sandwich washer 80 has two flat (or planar), axially opposite exterior surfaces: a turbine-side exterior surface 80a and a stator-side exterior surface 80b.

Figure 3:
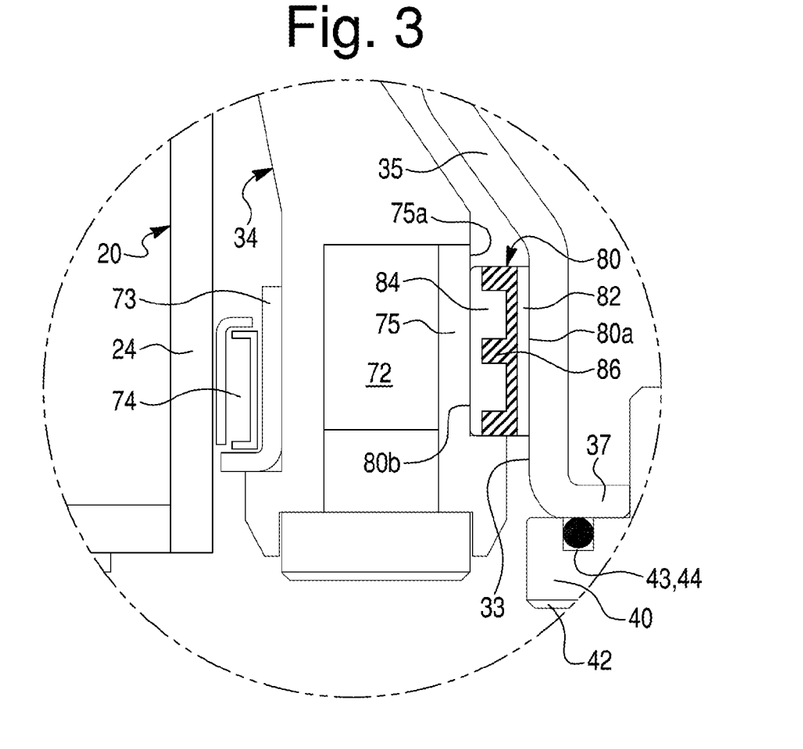
FIG. 3 is an enlarged view of a fragment of the hydrokinetic torque coupling device shown in the circle "III" in FIG. 1.

As best shown in FIGS. 1 and 3, the turbine-side outer member 82 is adjacent (or juxtaposed) to and rotatable relative to the turbine-piston 32, in particular the turbine-piston shell 35 of the turbine-piston 32, while the stator-side outer member 84 is adjacent to (or juxtaposed) and rotatable relative to an annular retainer plate 75 of the stator 34. For this reason, the axially opposite exterior surfaces 80a and 80b of the elastomeric sandwich washer 80, which are in rotationally sliding contact with an axially inner peripheral surface 33 the turbine-piston shell 35 and an axial peripheral surface 75a of the annular retainer plate 75 of the stator 34, respectively (as best shown in FIG. 3), may be covered with anti-friction material such to account for differences in rotational speed between the turbine-piston 32 and the stator 34. In other words, the anti-friction material may be situated at the interface of the elastomeric sandwich washer 80 and the outer member(s) 82 and/or 84. Alternatively, one of the axially opposite exterior surfaces 80a and 80b of the elastomeric sandwich washer 80 may be fixed to the turbine-piston shell 35 or the retainer plate 75 of the stator 34.

The elastomeric inner member 86 may be made from a variety of solid elastomeric materials, including rubber, polymer, foam, composites and any combination thereof. The elastomeric inner member 86 is secured to so as to be non-rotatable relative to both the turbine-side outer member 82 and the stator-side outer member 84, such as by adhesive bonding. As best shown in FIG. 7, the elastomeric inner member 86 occupies the entire space between the turbine-side outer member 82 and the stator-side outer member 84. Each of the rigid turbine-side and stator-side outer members 82, 84 may be made of, for example, a rigid (or stiff) molded plastic and/or stamped metal. For example, the turbine-side outer member 82 may be made of stamped metal, while the stator-side outer member 84 is made of molded plastic, or vice versa.

Figure 4:
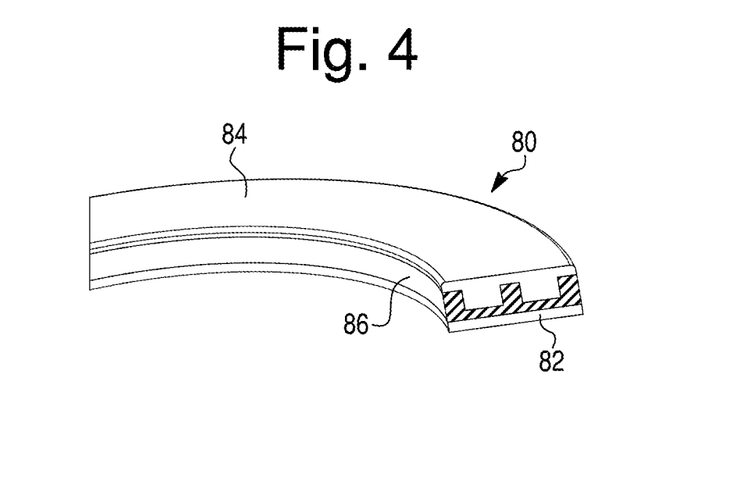
FIG. 4 is a segmented perspective view of a lockup resistance member in accordance with the first exemplary embodiment of the present invention.
Figure 5:
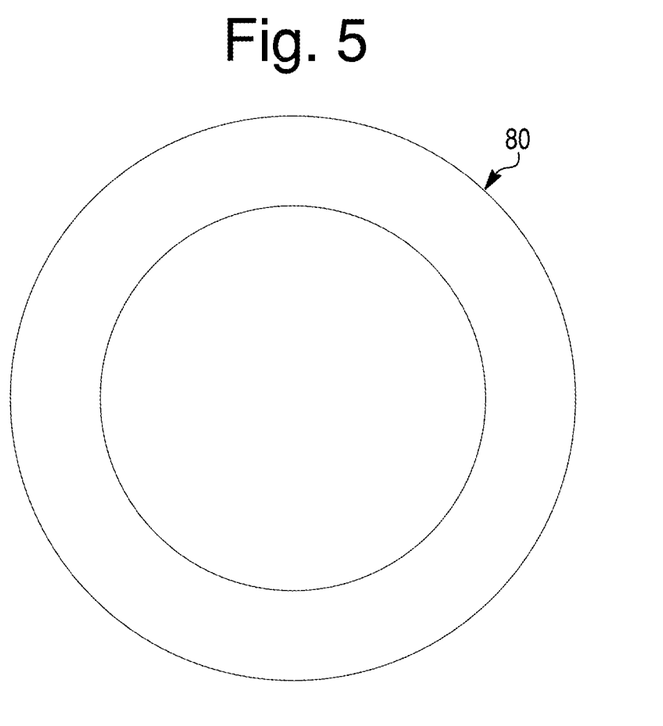
FIG. 5 is a front view of the lockup resistance member in accordance with the first exemplary embodiment of the present invention.

As best shown in FIGS. 4 and 7, the turbine-side outer member 82 is in the form of a ring having flat (or planar) axially opposite surfaces, one of which defines the turbine-side exterior surface 80a of the elastomeric sandwich washer 80, while the other surface is adjacent and adhesively bonded to the elastomeric inner member 86.

The stator-side outer member 84 is generally circular in the radial direction and has a flat (or planar) axially outer surface, which defines the stator-side exterior surface 80b of the elastomeric sandwich washer 80. The stator-side outer member 84 has one, two, three, or more, preferably two as best shown in FIG. 7, annular raised sections 85$_1$ and 85$_2$ axially extending toward the turbine-side outer member 82. The annular raised sections 85$_1$ and 85$_2$, which are shown concentric with one another, may be of the same or variable axial height. An inner surface of the stator-side outer member 84 located axially opposite to the stator-side exterior surface 80b is adhesively bonded to the elastomeric inner member 86. In other words, the elastomeric inner member 86 is integrally attached, such as by adhesive bonding, to both the turbine-side and stator-side outer members 82 and 84, respectively.

Figure 8:
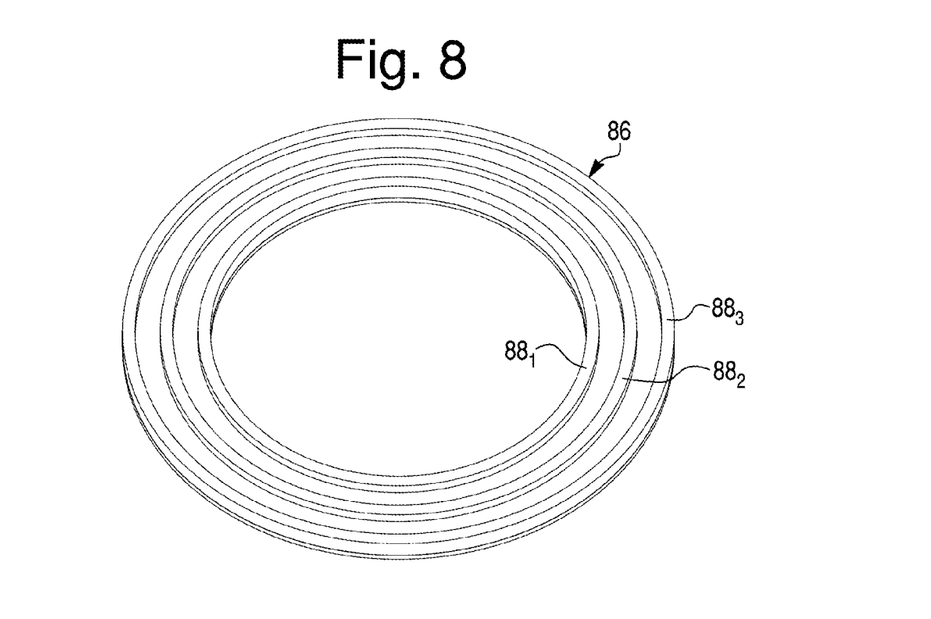
FIG. 8 is a perspective view of a resilient member of the lockup resistance member in accordance with the first exemplary embodiment of the present invention.

The elastomeric inner member 86 is generally circular and has one, two, three, or more, preferably three as best shown in FIG. 7, annular raised sections 88$_1$, 88$_2$ and 88$_3$ concentric with one another and axially extending between the turbine-side and the stator-side outer members 82 and 84, as best shown in FIGS. 7 and 8. The annular raised sections 88$_1$, 88$_2$ and 88$_3$ may be of the same or variable axial height. As further illustrated in FIG. 7, the annular raised sections 85$_1$ and 85$_2$ of the stator-side outer member 84 are alternatingly disposed between the annular raised sections 88$_1$, 88$_2$ and 88$_3$ of the elastomeric inner member 86. In other words, each of the annular raised sections 88$_1$, 88$_2$ and 88$_3$ of the elastomeric inner member 86 is disposed radially adjacent to at least one of the annular raised sections 85$_1$ and 85$_2$ of the stator-side outer member 84.

The turbine-side outer member 82 and the stator-side outer member 84 are coaxial to each other and axially spaced from each other by the width of the elastomeric inner member 86. Moreover, the turbine-side outer member 82 and the stator-side outer member 84 are axially moveable relative to each other due to the elasticity of the elastomeric inner member 86 disposed therebetween.

However, in certain embodiments, a width of the lockup resistance member 80 is selected such that the elastomeric sandwich washer 80 is not compressed when no axial thrust force is applied to the turbine-piston 32 in the direction toward the impeller 30, i.e., when no axial thrust force is generated in the hydrodynamic transmission mode of operation. As a result, the lockup resistance member 80 does not bias (or urge) the turbine-piston 32 away from the impeller 30 when no axial thrust force is generated in the hydrodynamic transmission mode of operation.

In the lockup mode, the first engagement surface 25 and the second engagement surface $39_2$ (or friction ring(s) 48 secured thereto) are pressed together such that the turbine-piston flange 38 of the turbine-piston 32 is frictionally non-rotatably coupled to the second sidewall portion 24 of the casing 12, thereby mechanically locking the turbine-piston 32 to the casing 12. When not in the lockup mode, the first engagement surface 25 and the second engagement surface $39_2$ are spaced from one another, such that the turbine-piston flange 38 is not frictionally non-rotatably coupled to the casing 12. In the non-lockup mode, normal operation of the torque converter 14 hydrodynamically couples and decouples the impeller 30 to and from the turbine-piston 32.

The torsional vibration damper 16 is housed in the casing 12 axially between the turbine-piston 32 and the first sidewall portion 22 of the casing 12, as shown in FIG. 1. The torsional vibration damper 16 is connected to a drive (or input) member 56 (discussed below), and includes a plurality of first (or radially outer) circumferential elastic damping members 60, an intermediate member 58 drivenly coupled to the drive member 56 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are radially outward from the second circumferential damping members 64. According to the exemplary embodiment of FIG. 1, the first and second damping members 60, 64 are configured as helical (or coil) springs oriented substantially circumferentially. Other elastic members may be selected to replace or supplement the springs.

The drive member 56 is fixedly connected to the turbine-piston shell 35 of the turbine-piston 32, such as by weld 55. The output side of the drive member 56 has a plurality of driving tabs 57 (FIG. 1) extending axially in the direction away from the turbine-piston 32. The driving tabs 57 of the drive member 56 are circumferentially equidistantly spaced from one another, and engage circumferential ends of the first damping members 60.

The intermediate member 58 has a plurality of driven tabs 59 extending axially in an opposite direction to the driving tabs 57 of the drive member 56. The driven tabs 59 of the intermediate member 58 are circumferentially equidistantly spaced from one another, and engage the opposite circumferential ends of the first damping members 60 than the driving tabs 57. The intermediate member 58 of the damper assembly 16 is rotatable relative to the drive member 56 and its driving tabs 57 due to elasticity of the first damping members 60, which absorb torsional vibration.

Additionally, the driving tabs 57 of the drive member 56 are axially movable relative to the driven tabs 59 of the intermediate member 58. This relative axial movement between the driving tabs 57 and the driven tabs 59 may become necessary during axial movement of the turbine-piston shell 35 between its lockup and non-lockup modes. As discussed in greater detail below, when the turbine-piston shell 35 shifts axially due to a lockup event, the driving tabs 57 move axially relative to the driven tabs 59. Thus, the drive member 56 is both axially and circumferentially moveable relative to the intermediate member 58, and generally to the damping assembly 16.

The radially inner portion of the intermediate member 58 forms or is connected to a first disk part 68 on a first side of the second damping members 64. The first disk part 68 is non-moveably secured to a second disk part 69 on the opposite side of the second damping members 64, such as by rivets or welding. The first and second disk parts 68, 69 establish an input part to the second damping members 64.

The driven member 62 establishes an output part of the second damping members 64. The driven member 62 has windows in which the second damping members 64 are set. The disk parts 68, 69 engage first ends of the second damping members 64, and the driven member 62 engages second ends of the second damping members 64. The disk parts 68, 69 are thus rotatable relative to the driven member 62, with the second damping members 64 absorbing torsional vibration due to their elasticity.

The driven member 62 is non-rotatably connected, e.g., fixed, to the output hub 40. The non-rotatable connection between the driven member 62 and the output hub 40 may be formed by splines or welding. Alternatively, the output hub 40 and the driven member 62 may be integrally formed as a single piece. A thrust bearing 76 is positioned between the output hub 40 and the first casing shell 18.

As discussed above, the turbine-piston 32 is axially movable toward and away from the impeller shell 20 between a lockup position and a non-lockup (open) position. Axial movement of the turbine-piston 32 is accomplished by changing the pressure differential between the opposite sides of the turbine-piston shell 35, taking into account an elastic force of the annular lockup resistance member 80. A pressure increase in the damper chamber 54 relative to the torus chamber 52 (or stated differently a pressure decrease in the torus chamber 52 relative to the damper chamber 54) that is greater than the stiffness of the annular lockup resistance member 80 shifts the turbine-piston shell 35 axially in the direction of torque transmission, i.e., towards the output side of the casing 12, that is right to left in FIG. 1, into the lockup mode. On the other hand, a pressure decrease in the damper chamber 54 relative to the torus chamber 52 (or stated differently a pressure increase in the torus chamber 52 relative to the damper chamber 54) acts with the elastic force of the elastomeric inner member 86 of the elastomeric sandwich washer 80 to shift the turbine-piston shell 35 and the turbine-piston flange 38 axially against the direction of torque transmission, i.e., towards the input side of the casing, that is left to right in FIG. 1, out of the lockup mode. Pressure changes are created by control of the fluid, e.g., hydraulic fluid or oil, in the chambers 52 and 54.

In the lockup mode, the turbine-piston shell 35 is displaced axially towards the impeller 30 until the frictional ring 48 of the second engagement surface $39_2$ of the turbine-piston flange 38 (which moves axially with the turbine-piston shell 35) abuts against and is non-rotatably frictionally coupled to the first engagement surface 25 of the casing 12. In the lockup mode, torque is transferred from the engine to the casing 12, then by way of the frictional engagement between surfaces 25 and $39_2$ (or the frictional lining 48 thereof) through the turbine piston shell 35 to the drive member 56 welded thereto, then serially to the damping assembly 16 and the output hub 40.

As the turbine-piston 32 and the drive member 56 move axially into the lockup position as described above, the driving tabs 57 of the drive member 56 are axially displaced relative to the driven tabs 59 of the intermediate member 58. The relative axial movement of the driving tabs 57 relative to the driven tabs 59 allows the intermediate member 58, the driven member 62, and the damping members 60, 64 to remain fixed axially on the output hub 40 while the turbine-piston 32 and the drive member 56 move in the axial direction. Moreover, the friction ring 48 secured to the second engagement surface $39_2$ may have a plurality of circumferentially spaced grooves (not shown) extending generally radially so as to fluidly connect the torus chamber 52 and the damper chamber 54 with one another in the lockup mode for cooling friction surfaces of the lockup clutch 50 by the working fluid and creating a very high pressure difference between the torus and damper chambers 52, 54.

In the non-lockup mode, the turbine-piston 32 is displaced axially away from the impeller 30, axially moving the turbine-piston shell 35 and the turbine-piston flange 38 until the second engagement surface $39_2$ (or the frictional lining 48 thereof) is spaced from and no longer non-rotatably frictionally coupled to the first engagement surface 25. Thus, torque is transferred from the engine to the casing 12 in a hydrodynamic transmission mode that does not bypass the torque converter 14 through the lockup clutch 50. The driving tabs 57 move axially towards the driven tabs 59 as the lockup clutch 50 is moved from the lockup mode to the non-lockup mode. Notably, in the non-lockup mode an open fluid passage is established between the first engagement surface 25 of the casing 12 and the second engagement surface $39_2$. Hydraulic fluid is free to flow between the torus chamber 52 and the damper chamber 54 through the passage.

In operation, the lockup clutch 50 is generally activated after the hydraulic hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston.

The turbine-piston 32 both forms the shell component of the turbine and the piston component of the lockup clutch 50, as described above. By consolidating two components that are normally separate from one another into a single component, space is saved in the hydrokinetic torque coupling device 10. This space-saving structure provides several design options. For example, the hydrokinetic torque coupling device 10 can be made smaller and lighter. Alternatively, the free space within the casing 12 can be used to add more additional components, such as damping components.

Figure 9:
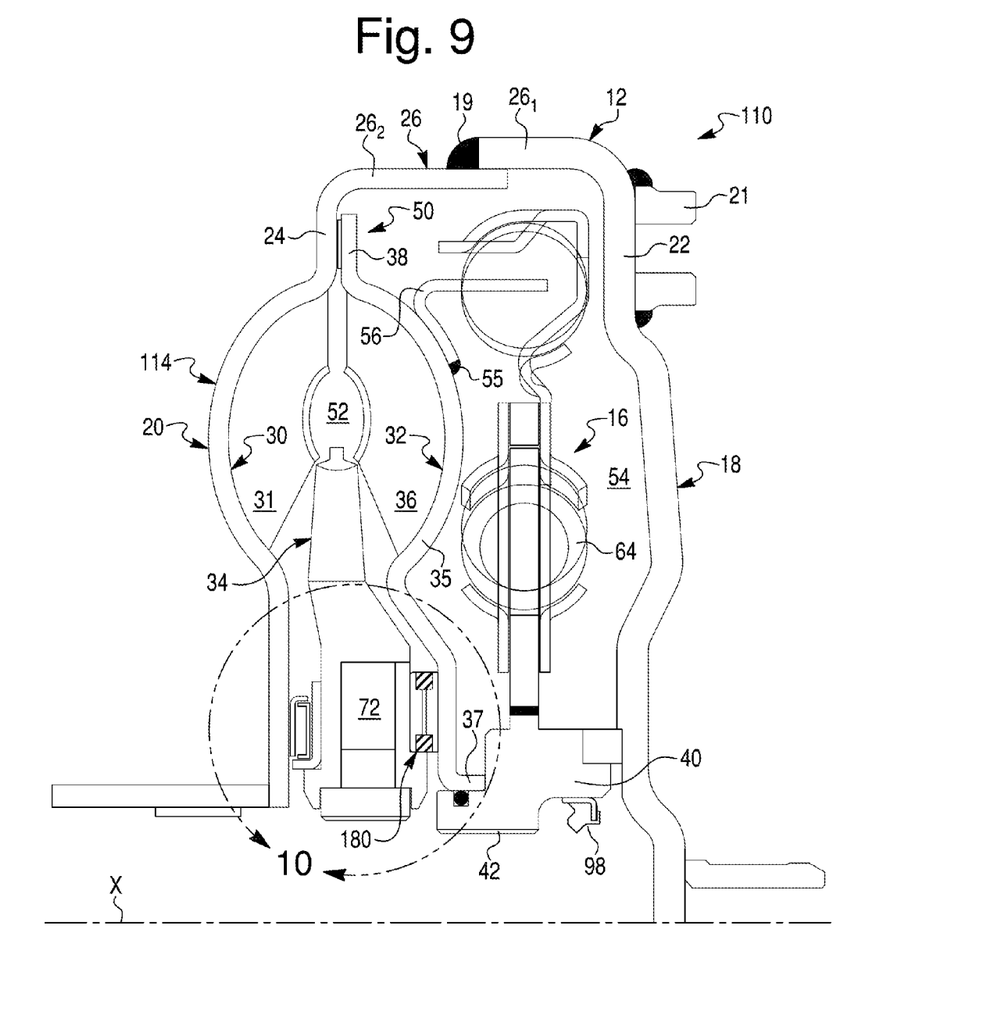
FIG. 9 is a fragmented half-view in axial section of a hydrokinetic torque coupling device equipped with a turbine-piston in accordance with a second exemplary embodiment of the present invention.
Figure 10:
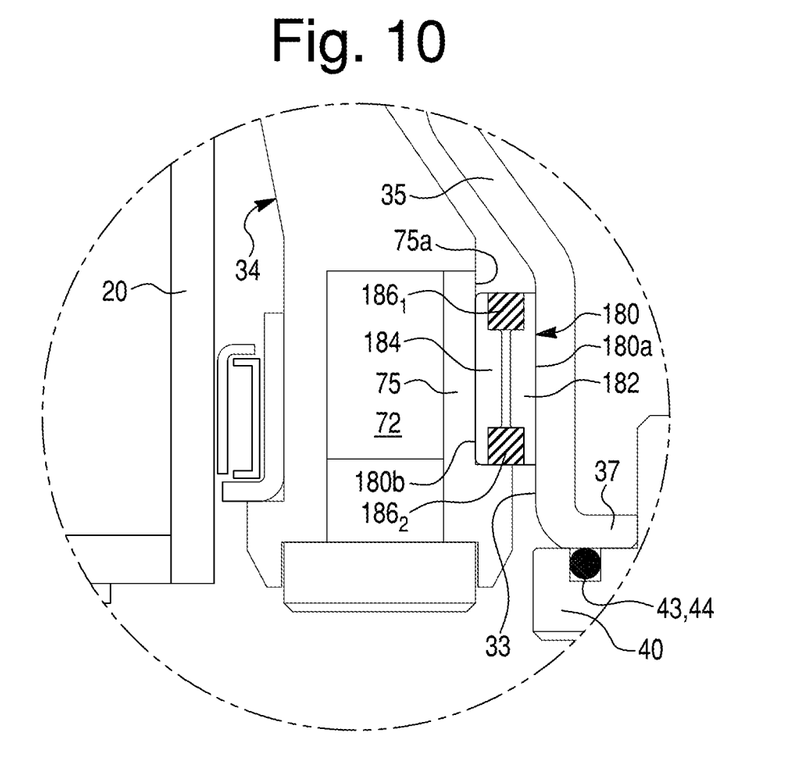
FIG. 10 is an enlarged view of a fragment of the hydrokinetic torque coupling device shown in the circle "X" in FIG. 9.
Figure 11:
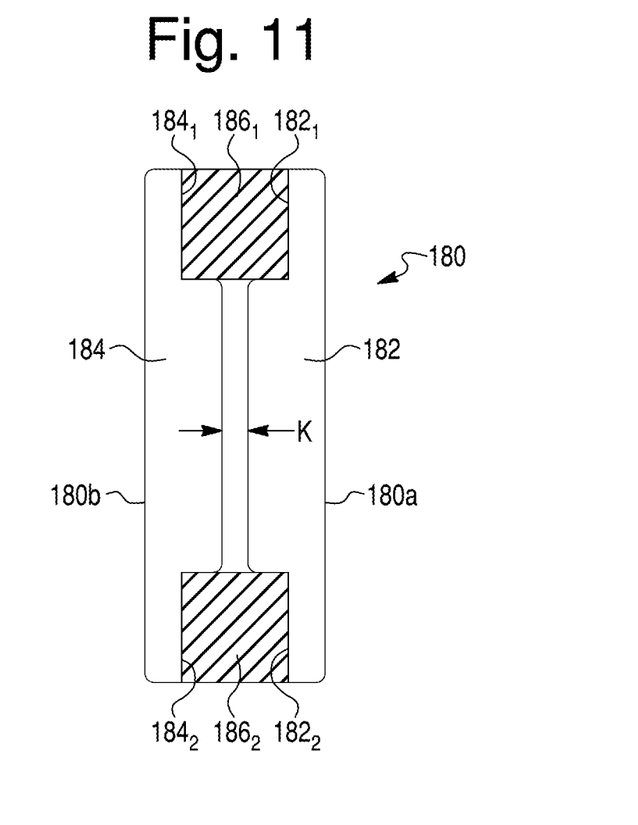
FIG. 11 is a cross-sectional view of the lockup resistance member in accordance with the second exemplary embodiment of the present invention.

Various modifications, changes, and alterations may be practiced with the above-described embodiment, including but not limited to the additional embodiment shown in FIGS. 9-11. In the interest of brevity, reference characters in FIGS. 9-11 that are discussed above in connection with FIGS. 1-8 are not further elaborated upon below, except to the extent necessary or useful to explain the additional embodiment of FIGS. 9-11. Modified components and parts are indicated by the addition of a hundred digits to the reference numerals of the components or parts.

In a hydrokinetic torque coupling device 110 of a second exemplary embodiment illustrated in FIGS. 9-11, the torque converter 14 with the annular elastomeric sandwich washer 80 is replaced by a torque converter 114 (FIG. 9) with an annular elastomeric sandwich washer 180. In the second exemplary embodiment of the present invention illustrated in FIGS. 9-11, the elastomeric sandwich washer 180 is coaxially aligned with the rotational axis X and includes a rigid (or stiff) non-elastomeric turbine-side outer member (or retainer) 182, a rigid (or stiff) non-elastomeric stator-side outer member (or retainer) 184, and first and second elastomeric rings $186_1$ and $186_2$ disposed (or sandwiched) between the rigid turbine-side outer member 182 and the rigid stator-side outer member 184. The elastomeric rings $186_1$ and $186_2$ are concentric to and radially spaced from each other, as best shown in FIG. 10. Although two elastomeric rings $186_1$ and $186_2$ are shown in the illustrated embodiment of FIGS. 9-11, it should be understood that the elastomeric sandwich washer 180 may contain one, two, three, or more concentric rings.

As best shown in FIGS. 10 and 11, the elastomeric sandwich washer 180 has two flat (or planar), axially opposite exterior surfaces: a turbine-side exterior surface 180a and a stator-side exterior surface 180b. The turbine-side exterior surface 180a is defined by the side of the turbine-side outer member 182 and is adjacent (or juxtaposed) to and rotatable relative to the turbine-piston 32, in particular the turbine-piston shell 35 of the turbine-piston 32. The stator-side exterior surface 180b is defined by the stator-side outer member 184 and is adjacent to (or juxtaposed) and rotatable relative to an annular retainer plate 75 of the stator 34. For this reason, the axially opposite exterior surfaces 180a and 180b of the elastomeric sandwich washer 180, which are in circumferentially sliding contact with an axially inner peripheral surface 33 the turbine-piston 32 and an axial peripheral surface 75a of the annular retainer plate 75 of the stator 34, respectively (as best shown in FIGS. 9 and 10), may be covered with anti-friction material such to account for differences in rotational speed between the turbine-piston 32 and the stator 34. In other words, the anti-friction material may be situated at the interface of the elastomeric sandwich washer 180 and the outer member(s) 182 and/or 184. Alternatively, one of the axially opposite exterior surfaces 180a and 180b of the elastomeric sandwich washer 180 may be fixed to the turbine-piston shell 35 or the retainer plate 75 of the stator 34.

The elastomeric rings $186_1$ and $186_2$ may be made from a variety of solid elastomeric materials, including rubber, polymer, foam, composites and any combination thereof. The elastomeric rings $186_1$ and $186_2$ are non-rotatably attached to both the turbine-side outer member 182 and the stator-side outer member 184, such as by adhesive bonding. As best shown in FIG. 11, the elastomeric rings $186_1$ and $186_2$ occupy the space between the turbine-side outer member 182 and the stator-side outer member 184 so as to define an axial clearance k between axially inner peripheral surfaces of the turbine-side and stator-side outer members 182, 184. Each of the rigid turbine-side and stator-side outer members 182, 184 may be made of, for example, a rigid (or stiff) molded plastic and/or stamped metal.

According the second exemplary embodiment the rigid turbine-side and stator-side outer members 182, 184 are structurally and dimensionally identical. As best shown in FIGS. 10 and 11, the turbine-side outer member 182 is in the form of an annular piece having completely flat (or planar) axially outer surface, which defines the turbine-side exterior surface 180a of the elastomeric sandwich washer 180, while an axially inner surface of the turbine-side outer member 182 is adjacent to the elastomeric rings $186_1$ and $186_2$ and is adhesively bonded thereto.

The stator-side outer member 184 is generally annular in the radial direction and has a flat (or planar) axially outer surface, which defines the stator-side exterior surface 180b of the elastomeric sandwich washer 180. An axially inner surface of the stator-side outer member 184 is adjacent to the elastomeric rings $186_1$ and $186_2$ and is adhesively bonded thereto.

Each of the turbine-side and stator-side outer members 182, 184 has two radially spaced, annular and coaxial first grooves $182_1$, $182_2$ and second grooves $184_1$, $184_2$ receiving the first and second elastomeric rings $186_1$ and $186_2$ therebetween, respectively. As best shown in FIG. 11, the first elastomeric ring $186_1$ occupies the space between the first grooves $182_1$, $184_1$ of the rigid turbine-side and stator-side outer members 182, 184, while the second elastomeric ring $186_2$ occupies the space between the second grooves $182_2$, $184_2$ of the rigid turbine-side and stator-side outer members 182, 184. Moreover, the elastomeric rings $186_1$ and $186_2$ occupy the space between the turbine-side outer member 182 and the stator-side outer member 184 so as to define an axial clearance k between axially inner peripheral surfaces of the turbine-side and stator-side outer members 182, 184.

The turbine-side outer member 182 and the stator-side outer member 184 are concentric to each other and axially spaced from each other. Moreover, the turbine-side outer member 182 and the stator-side outer member 184 are axially moveable relative to each other due to the elasticity of the elastomeric rings $186_1$ and $186_2$ disposed therebetween.

The sliding engagement by the axially opposite exterior surfaces 180a and 180b of the elastomeric sandwich washer 180 relative to the stator 34 and the turbine-piston 32 allows the annular lockup resistance member 180 to rotate relative to the stator 34 and the turbine-piston 32 when the lockup clutch 50 of the torque coupling device 110 is in non-lockup mode. Anti-friction material may be situated at the interface of the elastomeric sandwich washer 180 and the stator 34 and/or the turbine-piston 32. The purpose of the annular lockup resistance member 180 is to resist the axial thrust load generated by hydrodynamic transmission during the non-lockup mode, thus keeping the lockup clutch 50 disengaged until proper speed ratio between the turbine-piston 32 and the impeller 30 is achieved. However, the annular lockup resistance member 180 may be adapted not to bias (or urge) the turbine-piston 32 away from the impeller 30 when no axial thrust force is generated during the operation of the torque coupling device which is applied to the turbine-piston 32 in the direction toward the impeller 30.

Other variations and modifications of the annular lockup resistance member 80 may be practiced with the present invention. The features of the above-described embodiments may be practiced with one another and are substitutable in numerous combinations.

An exemplary method for assembling the hydrokinetic torque coupling device 10 according to the embodiment of FIGS. 1-8 will now be explained. It should be understood that this exemplary method may be practiced in connection with the other embodiments described herein. This exemplary method is not the exclusive method for assembling the hydrokinetic torque coupling devices described herein.

The impeller 30, the turbine-piston 32, the stator 34, the annular lockup resistance member 80/180, and the damper assembly 16 may each be preassembled. The turbine-piston 32 includes, as noted above, the turbine-piston shell 35 the turbine-piston blades 36 attached to the turbine-piston shell 35, and the turbine-piston flange 38.

The impeller 30, the stator 34, the lockup resistance member 80/180, and the turbine-piston 32 subassemblies are assembled together as shown in the drawings. The cylindrical flange 37 of the turbine-piston 32 is mounted to slidingly engage the hub 40 (splined with or mounted on the driven shaft at 42) with the seal 44 therebetween. The damper assembly 16 is then added. The driving tabs 57 are engaged with the damper assembly 16, and the driven member 62 is engaged to the output hub 40, as described above. The first casing shell 18 is non-moveably and sealingly secured, such as by welding at 19, to the second casing shell 20, as best shown in FIG. 1. The hydrokinetic torque coupling device 110 of FIGS. 9-11 can be assembled in a similar manner.

Figure 12:
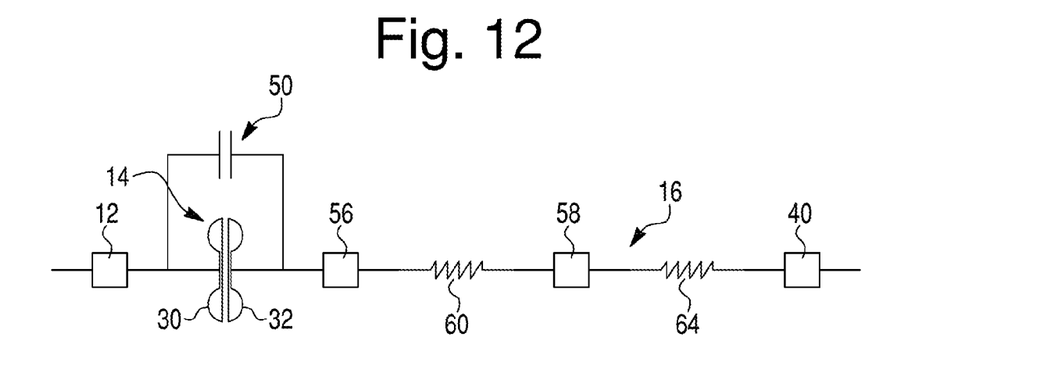
FIG. 12 is a simplified diagram of a hydrodynamic torque coupling device including a turbine-piston with a dual or double damper assembly.

The torque converters and hydrodynamic torque coupling devices described herein may incorporate different damper assemblies. For example, FIG. 12 shows a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60 and 64 of the damper assembly 16 and the output hub 40 are arranged serially downstream of the turbine-piston shell 35 in FIG. 12. The diagram of FIG. 12 generally corresponds to the arrangement of the embodiments shown in FIGS. 1 and 9.

Figure 13:
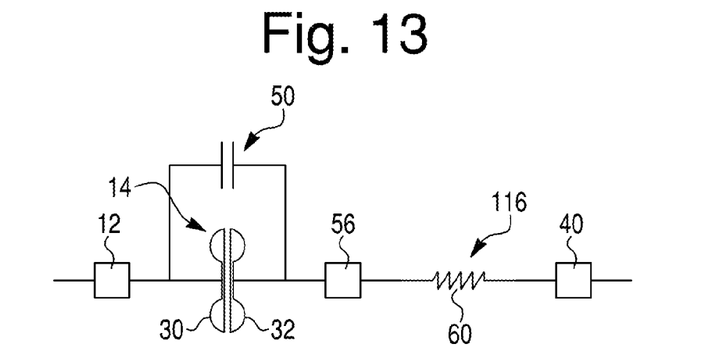
FIG. 13 is a simplified diagram of another hydrodynamic torque coupling device including a turbine-piston with a single damper assembly.

FIG. 13 shows an alternative damper assembly 116 similar to that of FIG. 12, but in which the damper assembly 16 is modified to include only one set of circumferentially extending elastic damping members 60.

Figure 14:
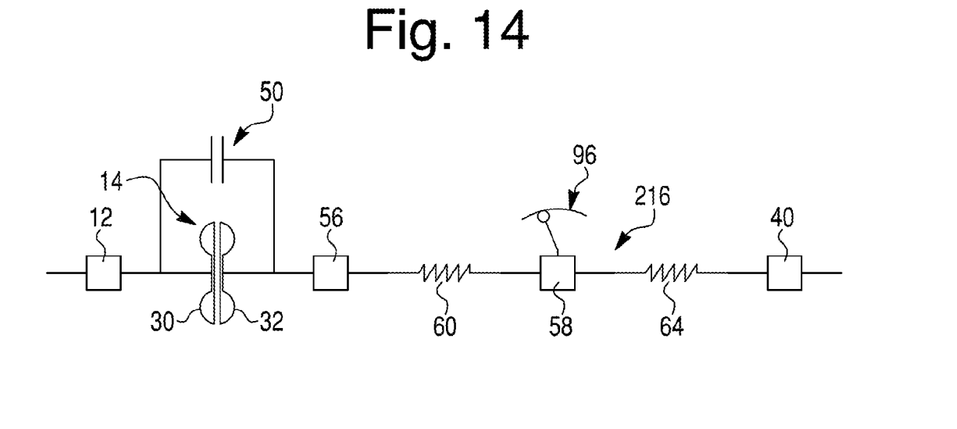
FIG. 14 is a simplified diagram of still another hydrodynamic torque coupling device including a turbine-piston with dual or double damper assemblies and a pendulum vibration absorber.

A damper assembly 216 shown in FIG. 14 is similar to that of FIG. 12, but further includes a centrifugal pendulum oscillator 96 coupled to the intermediate member 58. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 96 may be coupled to the circumference of the intermediate member 58 and may be arranged on both sides of the intermediate member 58.

Figure 15:
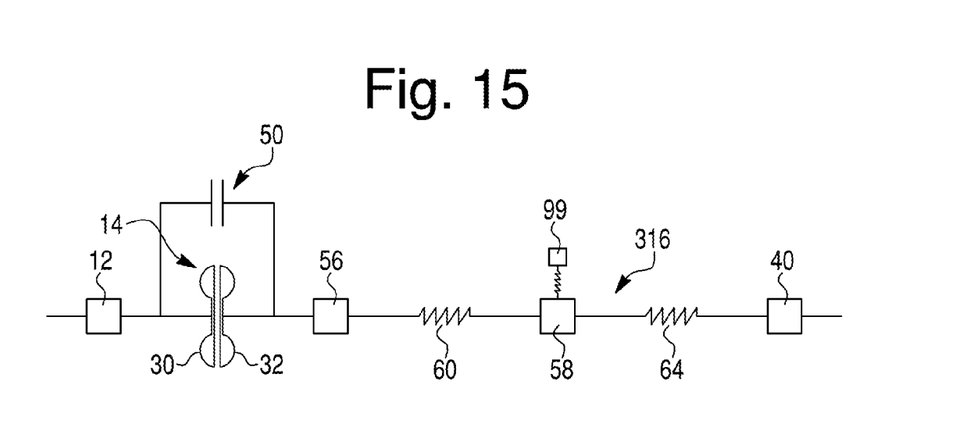
FIG. 15 is a simplified diagram of a further hydrodynamic torque coupling device including a turbine-piston with dual or double damper assemblies and a vibration absorbing spring-mass system.

A damper assembly 316 shown in FIG. 15 is similar to that of FIG. 12, but further includes a spring mass system 99 coupled to the intermediate member 58. Spring-mass systems are well known in the art and described in, for example, WO 2004/018897 to Haller. The spring-mass system 99 may be coupled to the circumference of the intermediate member 58. The spring of the spring-mass system 99 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrodynamic torque converter comprising:
an impeller having a rotational axis and comprising an impeller shell having a first engagement surface;
a turbine-piston coaxially aligned with and hydrodynamically drivable by the impeller, the turbine-piston comprising a turbine-piston shell comprising a turbine-piston flange having a second engagement surface facing the first engagement surface of the impeller shell, the turbine-piston being movable axially toward and away from the first engagement surface to position the torque converter respectively into and out of a lockup mode in which the turbine-piston is mechanically locked to so as to be non-rotatable relative to the impeller shell;
an annular lockup resistance member comprising an annular elastomeric sandwich washer coaxially aligned with the rotational axis and disposed between the impeller shell and the turbine-piston shell so as to resist axial movement of the turbine-piston toward the first engagement surface and into the lockup mode, the annular elastomeric sandwich washer comprising
axially opposite first and second outer members; and
an elastomeric inner member sandwiched between the first outer member and the second outer member and integrally attached to both the first and second outer members.

2. The torque converter of claim 1, wherein the elastomeric inner member is attached directly to both the first outer member and the second outer member.

3. The torque converter of claim 2, wherein the first outer member and the second outer member are axially spaced from each other and axially moveable relative to each other due to the elasticity of the elastomeric inner member disposed therebetween.

4. The torque converter of claim 3, wherein the elastomeric inner member is generally circular and has at least one annular raised section axially extending between the first outer and the second outer members.

5. The torque converter of claim 4, wherein the second outer member has at least one annular raised section axially extending toward the first outer member; and wherein the at least one annular raised section of the elastomeric inner member is disposed radially adjacent to the at least one annular raised section of the second outer member.

6. The torque converter of claim 3, wherein the elastomeric inner member includes two elastomeric rings coaxial to each other and radially spaced from each other.

7. The torque converter of claim 1, further comprising a stator situated between the impeller and the turbine-piston;
wherein the elastomeric sandwich washer is situated between the stator and the turbine-piston shell so that the first outer member is adjacent to the turbine-piston shell of the turbine-piston and the second outer member is adjacent to the stator.

8. The torque converter of claim 7, wherein the elastomeric sandwich washer is rotatable relative to at least one of the turbine-piston and the stator.

9. The torque converter of claim 8, wherein the elastomeric sandwich washer has a planar turbine-side exterior surface that circumferentially slidingly engages and is rotatable relative to the turbine-piston when the torque converter is out of the lockup mode.

10. The torque converter of claim 7, wherein the elastomeric sandwich washer has a planar stator-side exterior that circumferentially slidingly engages and is rotatable relative to the stator when the torque converter is out of the lockup mode.

11. The torque converter of claim 1, further comprising a friction lining secured to the first engagement surface of the impeller shell or the second engagement surface of the turbine-piston flange.

12. A hydrokinetic torque coupling device for coupling together a driving shaft and a driven shaft, the hydrokinetic torque coupling device being rotatable about a rotational axis and comprising:
a casing comprising an impeller shell and a casing shell interconnected to and non-rotatable relative to the impeller shell, the casing being rotatable about the rotational axis and having a first engagement surface; and
a torque converter coaxially aligned with and rotatable about the rotational axis, the torque converter comprising:
an impeller comprising the impeller shell;
a turbine-piston hydrodynamically drivable by the impeller and comprising a turbine-piston shell, the turbine-piston shell comprising a turbine-piston flange having a second engagement surface facing the first engagement surface of the casing, the turbine-piston being movable axially toward and away from the first engagement surface to position the hydrokinetic torque coupling device respectively into and out of a lockup mode in which the turbine-piston is mechanically locked to so as to be non-rotatable relative to the casing; and
an annular lockup resistance member comprising an annular elastomeric sandwich washer coaxially aligned with the rotational axis and disposed between the impeller shell and the turbine-piston shell so as to resist axial movement of the turbine-piston toward the first engagement surface and into the lockup mode, the annular elastomeric sandwich washer comprising
axially opposite first and second outer members; and
an elastomeric inner member sandwiched between the first outer member and the second outer member and integrally attached to both the first and second outer members.

13. The hydrokinetic torque coupling device of claim 12, further comprising a stator situated between the impeller and the turbine-piston; wherein the elastomeric sandwich washer is situated between the stator and the turbine-piston shell so that the first outer member is adjacent to the turbine-piston shell of the turbine-piston and the second outer member is adjacent to the stator.

14. The hydrokinetic torque coupling device of claim 13, further comprising:
   an output hub; and
   a torsional vibration damper interconnecting the turbine-piston and the output hub.

15. The hydrokinetic torque coupling device of claim 14, further comprising a drive member non-movably connected to the turbine-piston shell and connecting the turbine-piston shell to the torsional vibration damper, the torsional vibration damper further comprising a driven member operatively coupled to the output hub, and wherein the drive member is axially movable relative to the driven member of the torsional vibration damper.

16. The hydrokinetic torque coupling device of claim 14, further comprising a drive member interconnecting the turbine-piston shell to the torsional vibration damper, wherein the torsional vibration damper comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

17. The hydrokinetic torque coupling device of claim 14, further comprising a drive member interconnecting the turbine-piston shell to the torsional vibration damper, wherein the torsional vibration damper comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a spring mass system coupled to the intermediate member.

18. The hydrokinetic torque coupling device of claim 12, wherein the turbine-piston shell and the turbine-piston flange are axially movable towards an output side of the hydrokinetic torque coupling device in order to frictionally couple the first engagement surface and the second engagement surface for positioning the turbine-piston in the lockup mode, and wherein the turbine-piston shell and the turbine-piston flange are axially movable towards an input side of the hydrokinetic torque coupling device so that the first engagement surface and the second engagement surface are not frictionally coupled and the turbine-piston is out of the lockup mode.

19. The hydrokinetic torque coupling device of claim 13, wherein the first outer member and the second outer member are axially spaced from each other and axially moveable relative to each other due to the elasticity of the elastomeric inner member disposed therebetween; and wherein the elastomeric sandwich washer is rotatable relative to at least one of the turbine-piston and the stator.

20. A method of assembling a hydrokinetic torque coupling device for coupling a driving shaft and a driven shaft together, comprising:
   providing a torque converter rotatable about a rotational axis, the torque converter comprising:
      an impeller comprising an impeller shell, the impeller shell having a first engagement surface;
      a turbine-piston hydrodynamically drivable by the impeller and comprising a turbine-piston shell, the turbine-piston shell comprising a turbine-piston flange having a second engagement surface facing the first engagement surface of the impeller shell, the turbine-piston being movable axially toward and away from the first engagement surface to position the torque converter respectively into and out of a lockup mode in which the turbine-piston is mechanically locked to so as to be non-rotatable relative to the impeller shell; and
      an annular lockup resistance member comprising an annular elastomeric sandwich washer coaxially aligned with the rotational axis and disposed between the impeller shell and the turbine-piston shell so as to resist axial movement of the turbine-piston toward the first engagement surface and into lockup with the impeller shell, the annular elastomeric sandwich washer comprising
   axially opposite first and second outer members; and
   an elastomeric inner member sandwiched between the first outer member; and
   the second outer member and integrally attached to both the first and second outer members; and
   operatively connecting a casing cover shell to the impeller shell of the torque converter to form a casing that is rotatable about the rotational axis.

* * * * *